United States Patent
Popov et al.

(10) Patent No.: US 11,016,442 B2
(45) Date of Patent: May 25, 2021

(54) APPARATUS FOR DISPLAYING HOLOGRAPHIC IMAGES AND METHOD OF CONTROLLING THE SAME

(71) Applicant: SAMSUNG ELECTRONICS CO., LTD., Suwon-si (KR)

(72) Inventors: Mikhail Vyacheslavovich Popov, Krasnogorsk (RU); Stanislav Aleksandrovich Shtykov, Moscow (RU); Andrey Nikolaevich Putilin, Moscow (RU)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 412 days.

(21) Appl. No.: 15/852,797

(22) Filed: Dec. 22, 2017

(65) Prior Publication Data
US 2018/0181063 A1 Jun. 28, 2018

(30) Foreign Application Priority Data
Dec. 22, 2016 (RU) .......................... RU2016150504

(51) Int. Cl.
*G03H 1/08* (2006.01)
*G03H 1/22* (2006.01)
(Continued)

(52) U.S. Cl.
CPC ........... *G03H 1/0866* (2013.01); *G02B 30/26* (2020.01); *G03H 1/2205* (2013.01);
(Continued)

(58) Field of Classification Search
None
See application file for complete search history.

(56) References Cited

U.S. PATENT DOCUMENTS 3,924,925 A 12/1975 Gale et al.
5,394,262 A * 2/1995 Anderson .............. G02B 30/54
359/196.1
(Continued)

FOREIGN PATENT DOCUMENTS

JP 2007-25421 A 2/2007
JP 2007-188462 A 7/2007
(Continued)

OTHER PUBLICATIONS

Communication dated Sep. 26, 2019, issued by the European Patent Office in counterpart European Application No. 17883681.3.
(Continued)

*Primary Examiner* — Gelek W Topgyal
(74) *Attorney, Agent, or Firm* — Sughrue Mion, PLLC

(57) ABSTRACT

Provided are an apparatus for displaying a holographic image and a method of controlling the apparatus. The apparatus for displaying the holographic image includes a controller, a light source, an optical system, a spatial light modulator, a filter, an electric optical scanner, a multi-channel projection optics, and a screen. The spatial light modulator modulates a light beam passing through the optical system according to a predetermined subframe sequence of holographic image frames, the filter performs spatial-angular filtering of the modulated light beam to exclude parasitic diffraction order components from the modulated light beam, and the electric optical scanner directs the modulated and filtered light beam towards a corresponding channel of the multi-channel projection optics and forms a plurality of viewing zones on a focal plane of a field lens provided in the screen.

18 Claims, 2 Drawing Sheets

(51) Int. Cl.
    *G02B 30/26*         (2020.01)
    *G02B 27/00*         (2006.01)
    *G02B 5/00*          (2006.01)
    *G02B 27/28*         (2006.01)
    *G02B 30/24*         (2020.01)
    *G02B 30/35*         (2020.01)

(52) U.S. Cl.
    CPC ........... *G03H 1/2294* (2013.01); *G02B 5/005* (2013.01); *G02B 27/0081* (2013.01); *G02B 27/0093* (2013.01); *G02B 27/283* (2013.01); *G02B 30/24* (2020.01); *G02B 30/35* (2020.01); *G03H 2001/221* (2013.01); *G03H 2001/2207* (2013.01); *G03H 2001/2215* (2013.01); *G03H 2001/2242* (2013.01)

(56) References Cited

U.S. PATENT DOCUMENTS

| | | | |
|---|---|---|---|
| 6,577,429 B1 * | 6/2003 | Kurtz | G02B 27/48 347/239 |
| 6,760,135 B1 | 7/2004 | Payne et al. | |
| 7,088,483 B1 * | 8/2006 | Efimov | G02B 5/32 359/15 |
| 7,253,933 B1 * | 8/2007 | Efimov | H01S 3/0057 359/15 |
| 7,400,431 B2 | 7/2008 | Schwerdtner et al. | |
| 7,787,165 B2 | 8/2010 | Chao | |
| 8,149,265 B2 | 4/2012 | Smalley et al. | |
| 8,480,234 B2 | 7/2013 | Richards | |
| 9,041,989 B2 | 5/2015 | Leister et al. | |
| 2006/0238840 A1 | 10/2006 | Schwerdtner | |
| 2007/0242237 A1 | 10/2007 | Thomas | |
| 2008/0204663 A1 * | 8/2008 | Balogh | H04N 13/363 353/10 |
| 2009/0219385 A1 | 9/2009 | Leister et al. | |
| 2010/0060962 A1 * | 3/2010 | Rosen | G03H 1/0005 359/29 |
| 2010/0271676 A1 | 10/2010 | Renaud-Goud | |
| 2011/0002019 A1 * | 1/2011 | Routley | G02B 27/48 359/9 |
| 2011/0002020 A1 | 1/2011 | Khan | |
| 2011/0037953 A1 | 2/2011 | Nizani et al. | |
| 2013/0148179 A1 * | 6/2013 | Fridental | G03H 1/2294 359/9 |
| 2014/0240378 A1 * | 8/2014 | Fujioka | G02B 27/1066 345/690 |
| 2015/0116798 A1 | 4/2015 | Smithwick | |
| 2015/0201186 A1 | 7/2015 | Smithwick | |
| 2015/0234350 A1 | 8/2015 | Park et al. | |
| 2015/0277129 A1 | 10/2015 | Hua et al. | |
| 2016/0209808 A1 | 7/2016 | Byun et al. | |
| 2016/0320694 A1 | 11/2016 | Whitehead et al. | |
| 2016/0320752 A1 | 11/2016 | Seo et al. | |
| 2018/0046140 A1 * | 2/2018 | Smithwick | G03H 1/2205 |

FOREIGN PATENT DOCUMENTS

| | | |
|---|---|---|
| KR | 10-2014-0089677 A | 7/2014 |
| KR | 10-2015-0024198 A | 3/2015 |

OTHER PUBLICATIONS

International Search Report (PCT/ISA/210) and Written Opinion (PCT/ISA/237) dated Apr. 19, 2018 issued by the International Searching Authority in International Application No. PCT/KR2017/015344.

Communication dated Aug. 22, 2017 by the Russia Federal Service on Intellectual Property in counterpart Russian Patent Application 2016150504.

Communication dated Jan. 26, 2018 by the Russia Federal Service on Intellectual Property in counterpart Russian Patent Application 2016150504.

Communication dated Dec. 31, 2020 by the Indian Patent Office in corresponding Indian Application No. 201927025764.

* cited by examiner

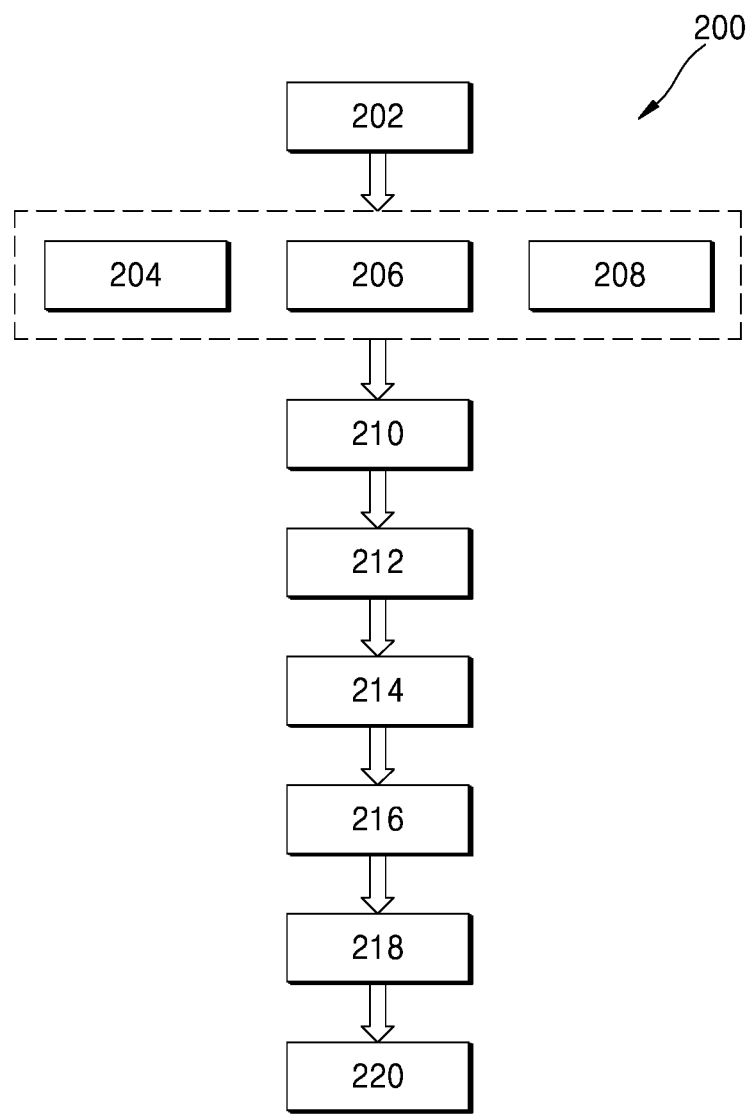

APPARATUS FOR DISPLAYING HOLOGRAPHIC IMAGES AND METHOD OF CONTROLLING THE SAME

CROSS-REFERENCE TO RELATED APPLICATION

This application claims priority from Russian Patent Application No. 2016150504, filed on Dec. 22, 2016 in the Russian Intellectual Property Office, the disclosure of which is incorporated herein in its entirety by reference.

BACKGROUND

1. Field

Apparatuses and methods consistent with exemplary embodiments relate to image display apparatuses, and more particularly, to apparatuses for displaying holographic display apparatuses and methods of controlling the apparatuses.

An exemplary apparatus for displaying holographic images and controlling method thereof consistent with exemplary embodiments may be used in different three-dimensional (3D) display devices capable of viewing holographic 3D images or 3D video without having to use glasses, in TV sets, projectors, augmented-reality devices, etc. An exemplary apparatus for displaying holographic images and a controlling method thereof according to exemplary embodiments may be used in different areas, such as entertainment, education, advertisement, medicine, art, etc.

2. Description of the Related Art

Known and promising three-dimensional (3D) display technologies include techniques for generating integrated images, parallax barrier-based techniques, techniques for generating volume images, holography-based techniques, and combinations thereof.

One widely used 3D display technology is based on a technique of generating stereoscopic images. This technology provides independent flat images separately, as a left eye image and a right eye image of a viewer. Accordingly, the viewer may only see the left eye image with the left eye and may not see the right eye image with the left eye, and vice versa for the right eye. Since this technology is typically implemented by using glasses of an active or passive type, the drawback of this technique is that it requires additional equipment (i.e. glasses).

One problem with technologies based on stereoscopic images is that they provide two flat images to the viewer without any possibility of controlling a parallax effect. Accordingly, there may be a mismatch between a focusing plane and a viewer's eye convergence plane. This is known as an accommodation-convergence conflict, which may cause headaches and eyestrain, and makes it impossible to generate a real 3D image. In the related art, the term "real 3D image" refers to a sequence of 3D points generated in a real or virtual space. Wave front of the points, when reaching a viewer's eye or a camera pupil, allows focusing (accommodating) on separate points of an object. When both eyes of a viewer watch such an image, the distance from the viewer's two eyes to an accommodation plane is equal to the distance to a convergence plane. In addition, the term "unreal 3D image" refers to an image that may not be focused on points of the object. For example, when an image is displayed on a screen or a display plane, both eyes of the viewer are focused on a plane other than that of the screen or the display plane. That is, in a case of an unreal 3D image, the distance to the accommodation plane is not equal to the distance to the convergence plane with respect to the viewer's eyes.

Since glassless type stereoscopic 3D display apparatuses generate stereo images, they have the above drawbacks regarding an unreal 3D image. A glass type stereoscopic 3D display apparatus requires the use of polarization 3D glasses or color 3D glasses for separating the left eye image from the right eye image, but this inconveniences the viewer due to the weight or size of the required glasses. Also, watching such images frequently results in headaches, excessive eyestrain, weariness, etc.

One principal technique for creating a 3D display capable of displaying real 3D images is a digital holography. Digital holography enables the reconstruction of 3D images so that both eyes of a viewer may focus on different points on the 3D image in a 3D space. In addition, due to the convergence of the axes of a viewer's eyes, additional information about a 3D object volume may be obtained without the accommodation-convergence conflict, thereby the viewer with perceptions of a displayed 3D object in an exact manner.

There are various solutions for a digital holographic display apparatus capable of reducing the aforementioned drawbacks.

One such solution is a display apparatus for displaying a 3D image and a method of reconstructing the 3D image by using the display apparatus (see U.S. patent publication 2006/0238840, published on Oct. 26, 2006). The display apparatus includes a light source and an optical system for illuminating a hologram carrier (media), and may alternately reconstruct left eye hologram and right eye hologram for a viewer by coding holograms in a time serial order.

Another such solution is a method and apparatus for coding and reconstructing video holograms for holographic scene reconstruction (see U.S. patent publication 2006/0050340, published on Mar. 9, 2006). This method and apparatus for coding and reconstructing the video holograms calculated by a computer use a liquid crystal display (LCD) panel that is widely used in a spatial light modulating technology. The holographic scene reconstruction is viewed in a viewing zone by both eyes of a viewer, and is possible due to the diffraction of pixels in the LCD panel. The viewing zones are formed by scanning directional illumination onto the LCD panel and providing digital holograms, that are calculated to be different for each eye, to the LCD panel. The method of forming a holographic image in only a localized viewing zone has various advantages. For example, there is no need to calculate a hologram throughout a wide viewing area, which reduces computational resources, required memory capacity, data transmission speed, calculation time, etc. Moreover, because the light radiated from the display screen is not diffused but is focused on pupils of the viewer's eyes, formation of the localized viewing zones is also effective in terms of energy costs.

However, the size of one viewing zone depends on the pixel size of the LCD panel and a focal distance of a screen lens (viewing distance). In the case of an LCD panel currently used in a display apparatus, a pixel size is about 35 μm to about 150 μm, which is too big to obtain a desired diffraction angle (+−5° to 30°). Since the size of the viewing zone formed in the above-described prototype is very small at this large pixel size, the distance at which the viewing zones are formed is a few meters. Accordingly, the viewer experiences such inconvenience that the viewer cannot move from this viewing zone, and a pupil movement of the eye results in cropping (that is, vignetting) a light beam from a reconstructed 3D object due to the relative movement of the pupils with respect to a pair of viewing zones.

In order to track a viewer's movement and to expand the viewing zone, the prototype suggests a scanning directional illumination that is operated with a system for tracking the viewer's eyes. However, the operational speed of the LCD display is limited to about 240 frames per second, and the quality of a reproduced image degrades when the viewer moves. Using a light emitting diode (LED) matrix for providing the directional illumination to the display causes chromatic distortion, and degrades the quality of the reconstructed holograms. Moreover, well-known modules that scan coherent illumination for RGB colors are expensive, and have low brightness uniformity across a display area and a restricted scanning range of about a few degrees.

Accordingly, there is a need for a holographic display apparatus capable of simultaneously increasing the size, resolution, and color grading levels of a displayed holographic image, while also filtering parasitic images, and increasing a viewing angle or size of a viewing zone for the holographic image.

SUMMARY

One or more exemplary embodiments may provide holographic display apparatuses capable of improving image quality of holographic images and increasing a size of a viewing zone.

Additional exemplary aspects will be set forth in part in the description which follows and, in part, will be apparent from the description, or may be learned by practice of the presented exemplary embodiments.

According to an aspect of an exemplary embodiment, an apparatus for displaying a holographic image includes a controller, a light source, an optical system, a spatial light modulator, a filter, an electric optical scanner, a multi-channel projection optics, and a screen.

The light source may be configured to generate at least one light beam. Further, the at least one light beam generated by the light source may have an initial diameter and an initial polarization state.

The optical system may be arranged at an output of the light source, and configured to increase the uniformity of the light intensity distribution of a cross-section of the light beam or to change a set light intensity distribution of the cross-section of the light beam. For example, the optical system may be configured to change the initial diameter of the light beam to a set diameter of the light beam in order to increase the uniformity of a light intensity distribution on the cross-section of the light beam or to obtain a set light intensity distribution of the cross-section of the light beam.

The spatial light modulator may be configured to modulate the light beam that is transmitted through the optical system according to a predetermined subframe sequence with respect to a holographic image frame.

The filter may be configured to perform a spatial-angular filtering of the modulated light beam to exclude a parasitic diffraction order component from the modulated light beam.

The electric optical scanner may be configured to control the modulated and filtered light beam and to direct the light beam towards a corresponding optical channel in the multi-channel projection optics. For example, when the at least one light beam generated by the light source has the initial polarization state, the electric optical scanner may be configured to control the initial polarization state of the modulated and filtered light beam to allow the modulated and filtered light beam to be directed toward the corresponding optical channel of the multi-channel projection optics.

The multi-channel projection optics may include at least two optical channels, and may be configured to relay each subframe of a subframe sequence transferred by the modulated and filtered light beam to a screen plane and to provide a predetermined subframe magnification factor k. Each optical channel may include a channel lens, and the multi-channel projection optics may include a common lens, common to two or more of the at least two optical channels. Optical axes of the channel lenses may be parallel to and decentered relative to an optical axis of the common lens. The channel lenses and the common lens may be configured to relay each subframe of the subframe sequence transferred from the modulated and filtered light beam in cooperation with each other.

The screen may include a field lens. The screen may be arranged at an output of the multi-channel projection optics. The screen may be configured to form a plurality of viewing zones in a focal plane of the field lens. The number of the viewing zones may correspond to the number of the channels of the multi-channel projection optics.

The controller may be configured to calculate the predetermined subframe sequence of the holographic image frame displayed on the screen. Also, the controller may be configured to generate and output control signals for the light source, the spatial light modulator, and the electric optical scanner according to the predetermined subframe sequence of the holographic image frame. The control signals may be used to control functions of the light source, the spatial light modulator, and the electric optical scanner.

In an exemplary embodiment, the light source may be a laser light source. The light source may be configured to emit a monochromatic light beam of a single wavelength in correspondence with a case where the holographic image is displayed in a single color. Alternatively, the light source may be configured to emit two or more light beams of two or more different wavelengths in correspondence with a case where the holographic image is displayed in multi-color.

In an exemplary embodiment, the spatial light modulator may be a micro display apparatus. The micro display apparatus may be one of a digital micromirror device (DMD) display apparatus, a ferroelectric liquid crystal on silicon (FLCoS) display apparatus, and a laser display apparatus in which laser emitters are arranged in a matrix.

In an exemplary embodiment, the controller may be a microcontroller including a processor, a memory, an input port, and an output port. The memory may be configured to store subframe sequences of holographic image frames input from outside via the input port. The processor may be configured to generate the control signals according to a selected subframe sequence and to output the control signals via the output port.

In an exemplary embodiment, the field lens may be a Fresnel lens. Also, the screen may further include a diffuser that increases a size of each viewing zone in a vertical direction perpendicular to the optical axis of the channel lenses. The diffuser may be a cylindrical lens raster or a holographic diffusing screen.

In an exemplary embodiment, the filter may include a lens system and a diaphragm.

In another exemplary embodiment, the filter may include a first lens and a second lens, and a slit diaphragm. A back focus of the first lens may be aligned with a front focus of the second lens. The slit diaphragm may be located at an alignment plane including the back focus of the first lens and the front focus of the second lens, and may be used to block passing of the parasitic diffraction order component of the light beam therethrough.

The electric optical scanner may include an electro-optical modulator that changes the initial polarization state of the light beam to a predetermined polarization state, and a beam splitter for directing the light beam having the predetermined polarization state to a corresponding channel of the multi-channel projection optics.

In an exemplary embodiment, a predetermined subframe magnification factor k may satisfy a condition $|k|>1$.

According to an aspect of another exemplary embodiment, a method of controlling an apparatus for displaying a holographic image according to the previous exemplary embodiments includes: providing information about a current holographic image frame to an input port of a controller, wherein the information about the current holographic image frame comprises data about a number of voxels of a 3D object on the current holographic image frame, coordinates (Xi, Yi, Zi) and light intensities of the voxels, wherein the coordinates of the voxels are calculated in advance based on an influence of a field lens of a screen, which converges light beams on a viewing zone; discretizing the coordinates (Xi, Yi) of the voxels according to a resolution of the screen in a horizontal direction and a vertical direction to obtain discrete coordinates $1 \ldots Nx, 1 \ldots Ny$ of the voxels; discretizing the coordinate Zi of the voxels according to a color depth of the screen to obtain a discrete coordinate Nz of the voxels; discretizing the light intensities of the voxels according to a maximum value of color grading levels of the screen to obtain discrete intensity values $0, \ldots, NI-1$ of the voxels; by using the discrete coordinates $1 \ldots Nx, 1 \ldots Ny$ and Nz of the voxels together with the discrete light intensity values $0 \ldots NI-1$ of the voxels, classifying the voxels as groups Gmn to increase resolution of each 3D object in the horizontal and vertical directions, where m and n are indexes of each group; selecting a number m of pixel groups in the horizontal direction and a number n of pixel groups in the vertical direction, based on the resolution and a size of an operating surface of the spatial light modulator; dividing each group Gmn of the voxels into b-bit planes, and $2^b$ is a number of color grading levels; in order to obtain a holographic image frame including m, n, and b subframes for one viewing zone and one color, calculating and recording a semi-zone plate with respect to a voxel in a predetermined bit plane in a binary format, according to the discrete intensity value of a predetermined voxel in a predetermined group Gmn selected within a range of $0 \ldots NI-1$; outputting, through an output port of the controller, a first control signal for the spatial light modulator, wherein the first control signal comprises a subframe sequence characterized by calculated subframes, outputting, from the controller, a second control signal for the light source so that the light source illuminates the spatial light modulator with at least one illumination pulse on outputting a subframe sequence corresponding to a b-th bit plane, wherein the at least one illumination pulse is amplitude-modulated or pulse width-modulated, an amplitude or a pulse width of the illumination pulse are in proportional to a number of output bit planes and calculated by a formula $C0+Cb*2^b$, where b is a current number of the bit planes and C0 and Cb are coefficients defined during calibrating brightness level of the screen; and after one holographic image frame including m, n, and b subframes directs towards one corresponding viewing zone by a multi-channel projection optics, outputting, from the controller, a third control signal for the electric optical scanner, wherein the third control signal changes at least one of spatial and angular location or direction of a modulated light beam by the electric optical scanner so that the modulated light beam directs towards a desired channel of the multi-channel projection optics, thereby forming a plurality of viewing zones with the screen.

In an exemplary embodiment, in order to increase calculation speed, the semi-zone plates for the discrete number of the voxels may be calculated in advance and stored in a memory of the controller or a volatile or non-volatile memory located outside the controller.

BRIEF DESCRIPTION OF THE DRAWINGS

These and/or other exemplary aspects and advantages will become apparent and more readily appreciated from the following description of the exemplary embodiments, taken in conjunction with the accompanying drawings in which:

FIG. 3 is a flowchart illustrating an exemplary method of operating the controller included in the holographic image display apparatus of FIG. 1.

DETAILED DESCRIPTION

Figure 1:
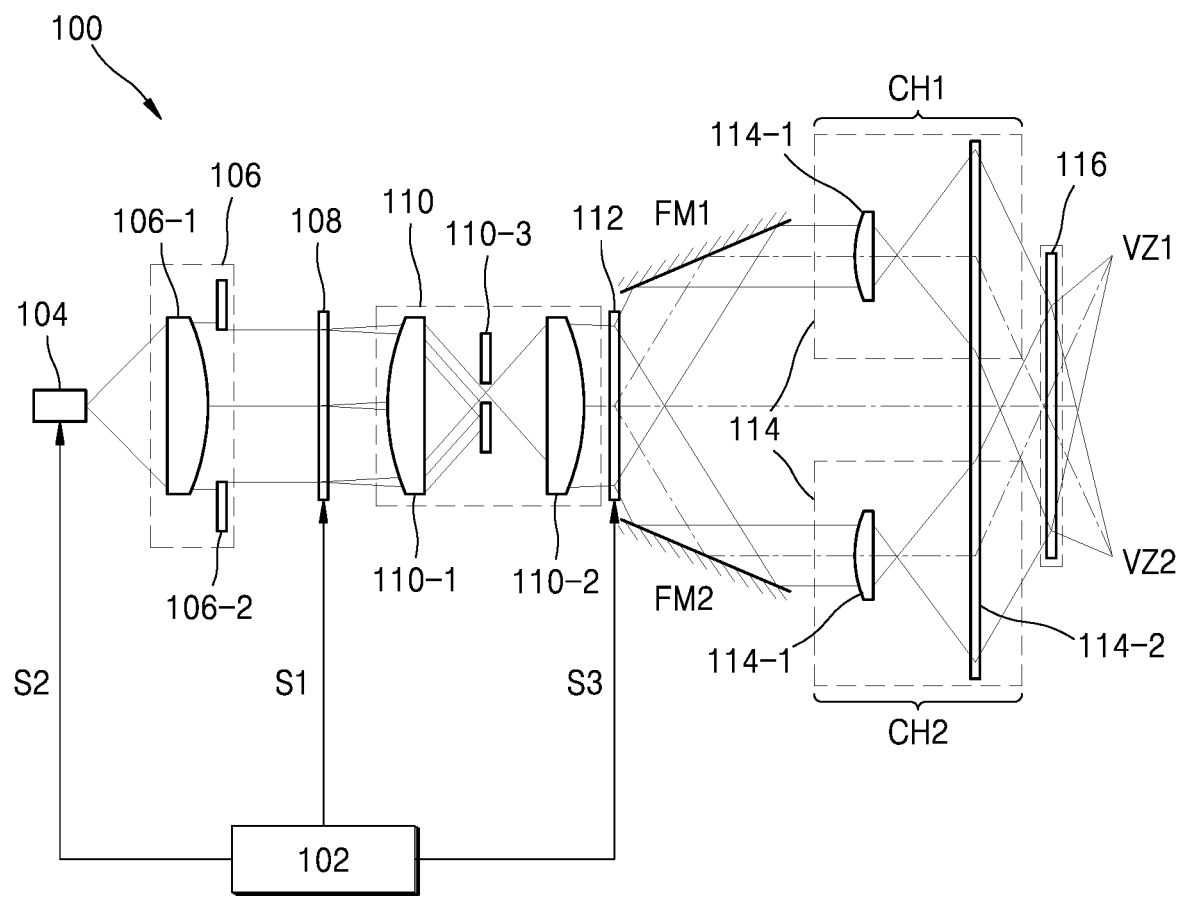
FIG. 1 is a schematic diagram of a holographic image display apparatus according to an exemplary embodiment.

The present specification describes exemplary embodiments so that a scope of the present disclosure may be clarified and one of ordinary skill in the art would carry out the present disclosure. The exemplary embodiments may be implemented in various types.

Throughout the specification, like reference numerals denote the same elements. The present specification does not explain all of the elements of the exemplary embodiments, and content common in the technical field to which the present disclosure belongs or same content among the embodiments will be omitted. In the specification, terminologies "module" or "unit" may be implemented by one or combination of two or more of hardware, software, and firmware, and according to the embodiments, a plurality of "modules" or "units" may be implemented as one element or one "module" or "unit" may include a plurality of elements.

Hereinafter, one or more exemplary embodiments will be described in detail with reference to accompanying drawings.

FIG. 1 is a schematic diagram of an apparatus 100 for displaying holographic images according to an exemplary embodiment. Referring to FIG. 1, the apparatus 100 for displaying holographic images includes a controller 102, a light source 104, a spatial light modulator 108, a filter 110, an electric optical scanner 112, multi-channel projection optics 114, and a screen 116.

First, operations and functions of the controller 102 will be described below.

Figure 2:
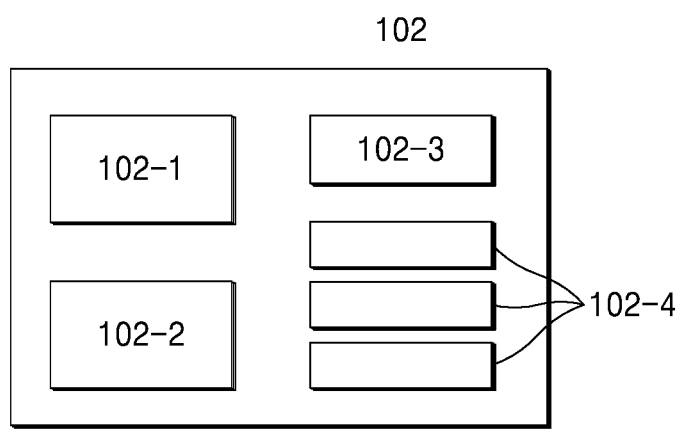
FIG. 2 is a schematic diagram of a controller included in the holographic image display apparatus of FIG. 1.

FIG. 2 is a schematic diagram of the controller 102 included in the apparatus 100 for displaying holographic images according to the present exemplary embodiment. The controller 102 may control overall operations of the apparatus 100 for displaying holographic images. The controller 102 may include a processor 102-1, a memory 102-2, an input port 102-3, and one or more output ports 102-4. The controller 102 may be, for example, a microcontroller.

The memory 102-2 may store one or more three-dimensional (3D) holographic image frames. As an example, one or more 3D holographic image frames may be input into the memory 102-2 via the input port 102-3. As another example, the 3D holographic image frames may be provided to the controller 102 from an external image source (not shown) such as a 3D video camera.

The processor 102-1 of the controller 102 may transform information about one or more 3D holographic image frames stored in the memory 102-2 into control signals S1, S2, and S3, for the spatial light modulator 108, the light source 104, and the electric optical scanner 112, respectively.

In particular, when data about a 3D holographic image frame is provided to the controller 102 from an external source, or when the data is extracted from the memory 102-2 of the controller 102 itself, the controller 102 calculates and generates a sequence of sub-frames (hereinafter, a subframe sequence) of the holographic image frames to be displayed on the screen 116. The subframe sequence carried by the control signal S1 from the output port 102-4 to the spatial light modulator 108 is generated by the method described below in order to increase a resolution and a color depth.

The controller 102 generates the control signal S2 for controlling the light intensity (or light pulse width) of the light source 104 that generates a light beam for illuminating the spatial light modulator 108. The control signal S2 corresponds to one subframe in the subframe sequence and is synchronized to be transmitted when the corresponding subframe is output to the spatial light modulator 108 in order to increase the color depth. The controller 102 controls parameters of the electric optical scanner 112. The electric optical scanner 112 directs the light beam that is modulated by the spatial light modulator 108 and filtered by the filter 110 according to the output subframe to an input unit of one channel of the multi-channel projection optics 114. When the light beam is directed to the input unit of one channel, the multi-channel projection optics 114 forms, with the screen 116 and a field lens (not shown), a viewing zone corresponding to the output subframe. The multi-channel projection optics 114 may increase the viewing angle by forming a plurality of viewing zones through the multi-channels.

The number of input ports 112-3 and the number of output ports 112-4 may vary depending on implementation and requirements of the entire apparatus 100 for displaying holographic images, in particular, the controller 102. For example, the controller 102 may include one input port 112-3 and three output ports 112-4. In this case, the three output ports 112-4 may be used to respectively output the control signals S1 to S3.

The light source 104 may be a laser light source, but is not limited thereto. The laser light source generates coherent, monochromatic, and polarized light. The light source 104 generates light within a wavelength range and a predetermined output (that is, energy) range that are sufficient in terms of output and spectral composition and are harmless to the eyes of a viewer.

The light beam generated by the light source 104 may be transformed to form a predetermined illumination distribution on the spatial light modulator 108. For example, the light beam generated by the light source 104 may be transformed to have a uniform illumination distribution on the spatial light modulator 108. To do this, the apparatus 100 for displaying the holographic images may further include an optical system 106, disposed on the light path between the light source 104 and the spatial light modulator 108. The optical system 106 may change the diameter of the light beam. The optical system 106 changes (for example, increases) the diameter of the light beam to increase the illumination uniformity on a predetermined area defined by an operating surface of the spatial light modulator 108 or to form a predetermined illumination distribution. As one example, the optical system 106 may include a beam shaper such as a collecting lens 106-1 and an aperture 106-2. As another example, the optical system 106 may include one or more collecting lenses to be used as an optical system for beam expansion. However, the present disclosure is not limited to these examples of the optical system 106. The optical system 106 may be omitted entirely, provided that the light source 104 outputs light that satisfies the uniform illumination distribution.

The light source 104 may output light of a single wavelength so as to generate and represent a holographic image of a single color. Alternately, the light source 104 may include light sources that output light of different wavelengths and have controllable light intensity so as to generate and represent a holographic image of multiple colors. The synchronization of the light source 104 and the controller 102 may be configured to increase the color depth of the displayed holographic image. The light source 104 illuminates the spatial light modulator 108, but is not limited thereto. For example, if the spatial light modulator 108 is a self-emissive light source, an additional light source may be omitted. If the spatial light modulator 108 includes an independent coherent light source (for example, a matrix of laser emitting devices such as laser diodes), an additional light source may be omitted.

The spatial light modulator 108 may be a micro-display apparatus. For example, the spatial light modulator 108 may be manufactured based on a digital micromirror device (DMD) technology having a high resolution, small pixel size, and high frame rate. The spatial light modulator 108 performs spatial modulation of the light beam generated by the light source 104 and transferred through the optical system 106. The spatial modulation of the spatial light modulator 108 is performed according to the subframe sequence provided to the spatial light modulator 108 (as a set of elementary holograms similar to zone Fresnel plates). The displayed hologram is coded by the spatial modulation of the spatial light modulator 108. High speed operation of the spatial light modulator 108 may increase the resolution and the color depth of the displayed holographic image, together with simultaneous synchronized operation of the controller 102 and the light source 104. In addition, other examples of the spatial light modulator 108 may include a micro display apparatus based on a ferroelectric liquid crystal on silicon (FLCoS) technique and a laser emitter matrix.

The filter 110 performs spatial-angular filtering of the light beam output from the spatial light modulator in order to filter parasitic diffraction orders, including a 0-th order diffraction (i.e., spot light) component, a complex-conjugate image component, and a higher-order diffraction order component occurring due to the pixel structure of the spatial light modulator 108. The filtering of the parasitic diffraction order components may improve the viewing quality (the viewing stability presented to the viewer) and the quality of displayed holograms (according to removal of the parasitic images).

The filter 110 may include a first lens 110-1 and a second lens 110-2, and a slit diaphragm 110-3, as shown in FIG. 1. A back focus of the first lens 110-1 is aligned at a front focus of the second lens 110-2. The slit diaphragm 110-3 may be located on a plane where the focuses of the first lens 110-1 and the second lens 110-2 are aligned. The slit diaphragm 110-3 is used to block the passing of the parasitic diffraction order component of the light beam. One of ordinary skill in the art would appreciate that the filter 110 of FIG. 1 is an example and the present disclosure is not limited thereto. The number and arrangement of the lenses similar to the first and second lenses 110-1 and 110-2 and/or diaphragms similar to the slit diaphragm 110-3 may vary depending on a certain purpose.

The electric optical scanner 112 may be a combination of an electro-optical modulator and a beam splitter (not shown). The beam splitter may be, for example, a polarization beam splitter. The electric optical scanner 112 may change a direction of the light beam output from the filter 110 according to the control signal S3 output from the controller 102. The electric optical scanner 112 may discretely change the direction of the light beam output from the filter 110, so that the direction of the light beam output from the filter 110 may be matched with an input unit of the multi-channel projection optics 114 (without an additional shift or tilt of the optical system). Folding mirrors FM1 and FM2 are provided at the input unit of the multi-channel projection optics 114 for deviating the light beam to different optical channels, so that the light beam input into the input unit may proceed to each corresponding optical channel. According to the above configuration, the electric optical scanner 112 alternately switches operation of the optical channel, and forms the viewing zone for each optical channel. Here, by increasing the number of viewing zones, the viewing angle of the holographic image may be expanded. Since parameters of the light beam may be changed either before or after the spatial light modulator 108, the electric optical scanner 112 may be located in front of or behind the spatial light modulator 108.

The multi-channel projection optics 114 may include two or more optical channels CH1 and CH2. Each of the optical channels CH1 and CH2 may include a channel lens 114-1 and a common lens 114-2. The channel lens 114-1 may be provided for each of the optical channels CH1 and CH2. The common lens 114-2 may be common to the two or more optical channels CH1 and CH2. Optical axes of the channel lenses 114-1 are parallel and decentered relative to an optical axis of the common lens 114-2. In addition, pairs each including the channel lens 114-1 and the common lens 114-2 configure a telescopic system that is an optical system for relaying an image with a magnification Mpr (that is, magnification of the multi-channel projection optics 114). Here, the magnification Mpr is equal to a ratio of focal distances F114-2/F114-1. The relaying of the holographic image (or subframe of the holographic image frame) to the plane of the screen 116 with the magnification Mpr represents that the holographic image displayed on the viewing zone may be enlarged. Decentering amounts of the channel lenses 114-1 may be determined according to a condition for forming the viewing zone at a desired point. Parameters of the channel lenses 114-1 may be different from one another in order to correct residual aberration of the multi-channel projection optics 114, and accordingly, a condition of constant image quality may be satisfied. The parameters of the channel lenses 114-1 may include, for example, a shape of the lens, material of the lens, and constructive parameters.

The screen 116 on which the field lens (not shown) may be used to form the viewing zones VZ1 and VZ2. It may be appreciated that the field lens converges the light beam onto the screen 116 to form the viewing zones VZ1 and VZ2. The viewing zones VZ1 and VZ2 are formed at a predetermined distance that is equal to a focal distance of the field lens. The size of one viewing zone is defined by Equation 1 below.

$$\lambda \cdot f'_{fl} / (M_{pr} \cdot pSLM) * \lambda \cdot f'_{fl} / (2 \cdot M_{pr} \cdot pSLM) \qquad (1)$$

Here, $\lambda$ denotes a wavelength of the light source 104, $f'_{fl}$ denotes a back focal distance of the field lens, $M_{pr}$ denotes a linear increase of a corresponding channel in the multi-channel projection optics 114, and pSLM denotes a pixel size of the spatial light modulator 108. Since only horizontal parallax will exist in the present embodiment, there is a possibility of expanding the viewing zone in a vertical direction. A diffuser (not shown) may be used to expand the viewing zone in the vertical direction. Here, the vertical direction is a direction perpendicular to the optical axes of the channel lenses 114-1.

Next, operations of the controller 102 will be described below with reference to FIG. 3.

FIG. 3 is a flowchart illustrating a method 200 of operating the controller 102. The controller 102 generates control signals for the light source 104, the spatial light modulator 108, and the electric optical scanner 112. The controller 102 operates to improve the resolution and the color depth of the displayed holographic image.

Referring to FIG. 3, information about a current holographic image frame is provided to an input of the controller 102 in operation 202. The information about the current holographic image frame includes data about the number of voxels (volume pixels) of a 3D object included in the current holographic image frame, coordinates (Xi, Yi, Zi), and light intensities Ii of the voxels. The coordinates of the voxels may be calculated in advance based on an effect of the field lens that converges the light beam onto the viewing zones VZ1 and VZ2.

In operation 204, the coordinates Xi and Yi of the voxels in the current holographic image frame in horizontal and vertical direction are discretized according to the resolution of the screen 116, and then, discrete coordinates 1 . . . Nx, 1 . . . Ny of the voxels may be obtained.

In operation 206, the coordinates Zi of the voxels of the current holographic image are discretized according to the color depth of the screen, and then, discrete coordinates Nz of the voxels are obtained.

In operation 208, the light intensities Ii of the voxels in the current holographic image frame are discretized according to a maximum value of color grading levels of the screen, and then, discrete light intensity values 0 . . . NI-1 of the voxels are obtained.

In operation 210, the voxels are classified as groups Gmn by using the discrete coordinate values 1 . . . Nx, 1 . . . Ny, and Nz and the discrete light intensity values 0 . . . NI-1 of the voxels, in order to improve resolution of each 3D object in horizontal and vertical directions. Here, m and n denote indexes of each group.

In operation 212, the spatial light modulator 108 encodes the holographic image to be displayed as one voxel. The numbers of pixels m and n in the horizontal and vertical directions, respectively, are selected according to the resolution of the spatial light modulator 108 and the size of an operating surface of the spatial light modulator 108. The holographic image of an elementary voxel is a spatial distribution of an amplitude and/or phase similar to those of a semi-zone Fresnel plate. Here, parameters of the semi-zone Fresnel plate are determined according to a distance from the voxel to a calculation plane of the holographic image. In addition, sizes of the zone plate (or pixel resolution) in the horizontal axis and the vertical axis are selected in order to minimize the size of the existing zone plate, so that the resolution of the voxels in the corresponding group may be increased when minimizing the size of diffusion spots of the displayed voxels. The size of the voxels depends on an aperture that encodes them (because of the diffraction on the aperture when the voxels are displayed). The inventors of the present disclosure have found the following values experimentally: the spatial light modulator having 32×16 to 128×64 pixels (for example, 64×32 pixels) encodes one semi-zone Fresnel plate. The number of groups may be 8 in the horizontal direction and 4 in the vertical direction, which denotes that the resolution is improved 8×4=32 times greater at the above size of the semi-zone plate.

In operation 214, each of the groups Gmn of the voxels are divided as b-bit planes, where $2^b$ is a number of color grading levels.

In operation 216, a semi-zone plate for the voxel is calculated according to the discrete light intensity value of a certain voxel in a certain group Gmn selected from the light intensity values 0 . . . NI-1, and is recorded in a predefined bit plane in a binary format. For example, when the color depth is 8 bits and a relative voxel light intensity is $77/2^8$, i.e., equal to 77/256, the voxel is encoded by 8-th bit plane of brightness. The existence of the semi-zone plate in the bit planes will be defined from transformation: 77d=01001101b. That is, if a starting bit plane is the least bit, the semi-zone plate will be recorded in bit planes 1, 3, 4, and 7. Therefore, one frame corresponding to one viewing zone and one color includes m, n, b subframes.

If it is necessary to increase calculation speed, the semi-zone plates for the discrete numbers of the voxels may be calculated in advance and recorded in the memory of the controller 102 or another volatile or non-volatile memory outside the controller 102.

In operation 218, when the holographic image is displayed as described above, the controller 102 outputs the control signal S1 for the spatial light modulator 108 (in an order of the calculated subframe sequence). On outputting the subframe corresponding to a b-th bit plane, the controller 102 outputs the control signal S2 for controlling the light source 104 so that the light source 104 may illuminate the spatial light modulator 108. The light source 104 may illuminate with an illumination pulse (or light beam), and the illumination pulse may be amplitude-modulated or pulse width-modulated. The amplitude or the pulse width of the illumination pulse is proportional to the number of output bit plane, that is, $C0+Cb*2^b$. Here, b is a current number of the bit plane, and C0 and Cb are coefficients that are determined when calibrating brightness level of the screen 116.

Therefore, the number of the color grading levels may increase. (In an initial state, the spatial light modulator 108 based on the DMD technology only has a color depth of one bit. That is, any of the pixels in the spatial light modulator 108 may be turned on or turned off. The proposed method of encoding the holograms is associated with controlling by using the illumination, and may increase the number of color grading levels of the holographic image.)

In operation 220, after the holographic image frame with respect to one viewing zone is output, the controller 102 generates the control signal S3 for the electric optical scanner 112. The holographic image frame with respect to one viewing zone may include m, n, and b subframes. The electric optical scanner 112 may operate based on electro-optical effects (a variation in optical properties of a medium under an electric field applied from outside) without a movable element. The control signal S3 controls the electric optical scanner 112 to change the spatial and/or angular location or direction of the modulated light beam so that the modulated light beam may proceed towards the desired optical channel (e.g., CH1 or CH2) of the multi-channel projection optics 114. Accordingly, the multi-channel projection optics 114 forms, together with the screen 116, a plurality of viewing zones. As the number of viewing zones increases, the viewing angle of the holographic image may be expanded.

By using the electric optical scanner 112 without a movable element such as a mirror, the lifespan of the apparatus 100 for displaying the holographic image may increase, and moreover, noise or vibration occurring when the apparatus 100 for displaying the holographic images operates may be reduced. However, the electric optical scanner 112 of the present exemplary embodiment is not limited to a case without the movable element, and the electric optical scanner 112 may include a movable element such as a movable mirror according to a microelectromechanical system (MEMS) technology.

Also, exemplary embodiments are not limited to the above order of operations 202, . . . , 220 in the method 200. If necessary, some of the operations 202 to 220 may be combined with each other without losing any of the above mentioned advantages. For example, as denoted by a dashed line of FIG. 3, operations 204 to 208 may be combined as one operation.

The apparatus for displaying the holographic image and the method of controlling the same according to exemplary embodiments may have following effects.

First, a size of the displayed image may be increased, and at the same time, at least one group of viewing zones for left and right eyes of the view may be formed, and thus, the viewing angle with respect to the holographic image may be increased. This may be achieved by displaying the holographic image or subframes of the holographic image frame by using the multi-channel projection optics. For example, a magnification factor of the subframe may be equal to 1 (in modulus).

Second, according to one or more exemplary embodiments, the spatial and angular filtering may be exclusively used to perform filtering of the parasitic diffraction order component, and accordingly, the viewing zones of the holographic image may be formed effectively and stably.

Third, the resolution of the reproduced holographic image and the number of color grading levels may be increased.

Fourth, the quality of the holographic image may be improved by applying the method of filtering the parasitic image and encoding the displayed holograms.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. An apparatus for displaying a holographic image, the apparatus comprising:
   a light source configured to output a light beam;
   an optical system arranged such that the light beam is incident on the optical system, wherein the optical system is configured to change a light intensity distribution of the cross-section of the light beam;
   a spatial light modulator configured to modulate the light beam transmitted through the optical system according to a predetermined subframe sequence with respect to a holographic image frame;

a filter configured to perform a spatial-angular filtering of the light beam modulated by the spatial light modulator, thereby excluding a parasitic diffraction order component from the light beam;

an electric optical scanner configured to control the light beam output from the filter and to direct the light beam towards a corresponding optical channel of a multi-channel projection optics;

the multi-channel projection optics comprising at least two optical channels, and configured to relay each subframe of a subframe sequence transferred by the light beam to a screen plane and to provide a predetermined subframe magnification factor k;

a screen comprising a field lens, arranged such that the light beam output by at the multi-channel projection optics is incident on the screen, wherein the screen is configured to form a plurality of viewing zones in a focal plane of the field lens, wherein a number of the viewing zones is the same as a number of the at least two optical channels of the multichannel projection optics; and a controller configured to calculate the predetermined subframe sequence of the holographic image frame displayed on the screen, to generate and output control signals for each of the light source, the spatial light modulator, and the electric optical scanner according to the predetermined subframe sequence of the holographic image frame, and to control each of the light source, the spatial light modulator, and the electric optical scanner, wherein the electric optical scanner comprises an electro-optical modulator that changes an initial polarization state of the light beam to a predetermined polarization state, and a beam splitter which directs the light beam having the predetermined polarization state to the corresponding channel of the multi-channel projection optics.

2. The apparatus of claim 1, wherein the optical system is configured to increase a uniformity of the light intensity distribution of the cross-section of the light beam.

3. The apparatus of claim 1, wherein the optical system is configured to change an initial diameter of the light beam to a set diameter, thereby increasing a uniformity of the light intensity distribution on the cross-section of the light beam or obtaining a set light intensity distribution of the cross-section of the light beam.

4. The apparatus of claim 1, wherein the electric optical scanner is configured to control an initial polarization state of the light beam output by the filter, thereby directing the light beam toward the corresponding optical channel.

5. The apparatus of claim 1, wherein the multi-channel projection optics comprises a common lens common to all of the at least two optical channels, and each optical channel of the at least two optical channels comprises a channel lens, wherein an optical axis of the channel lens is parallel to and decentered relative to an optical axis of the common lens, and wherein the channel lens and the common lens are configured to relay each subframe of the subframe sequence transferred from the light beam in cooperation with each other.

6. The apparatus of claim 5, wherein the screen further comprises a diffuser that increases a size of each viewing zone in a vertical direction perpendicular to the optical axis of the channel lens.

7. The apparatus of claim 6, wherein the diffuser is one of a cylindrical lens raster and a holographic diffusing screen.

8. The apparatus of claim 1, wherein the light source comprises a laser light source.

9. The apparatus of claim 1, wherein the light source is configured to output a monochromatic light beam.

10. The apparatus of claim 1, wherein the light source is configured to output two or more light beams of two or more wavelengths, respectively.

11. The apparatus of claim 1, wherein the spatial light modulator comprises a micro display apparatus.

12. The apparatus of claim 11, wherein the micro display apparatus is one of a digital micromirror device (DMD) display apparatus, a ferroelectric liquid crystal on silicon (FLCoS) display apparatus, and a laser display apparatus in which laser emitters are arranged as a matrix.

13. The apparatus of claim 1, wherein the controller is a microcontroller comprising including a processor, a memory, an input port, and an output port, wherein the memory is configured to store subframe sequences of holographic image frames received via the input port, and the processor is configured to generate the control signals according to a selected subframe sequence and to output the control signals via the output port.

14. The apparatus of claim 1, wherein the field lens is a Fresnel lens.

15. The apparatus of claim 1, wherein the filter comprises a lens system and a diaphragm.

16. The apparatus of claim 1, wherein the predetermined subframe magnification factor k satisfies a condition $|k|>1$.

17. The apparatus of claim 1, wherein:
the filter comprises a first lens, a second lens, and a slit diaphragm,
a back focus of the first lens is aligned at a front focus of the second lens,
the slit diaphragm is located at an alignment plane including the back focus of the first lens and the front focus of the second lens; and
the slit diaphragm is configured to block transmission of the parasitic diffraction order component of the light beam.

18. An apparatus for displaying a holographic image, the apparatus comprising:
a light source configured to output a light beam;
an optical system configured to change a light intensity distribution of the light beam incident thereon;
a spatial light modulator configured to modulate the light beam transmitted by the optical system;
a filter configured to block a parasitic diffraction order component of the light beam transmitted by the spatial light modulator;
an electric optical scanner configured to direct the light beam transmitted by the filter to a corresponding channel of a multi-channel projection optics;
the multi-channel projection optics comprising at least two optical channels and configured to relay subframes of a subframe sequence transferred by the light beam transmitted by the electric optical scanner, to a screen plane and to provide a predetermined subframe magnification factor;
a screen comprising a field lens, wherein the light beam transmitted by the multichannel projection optics forms a plurality of viewing zones in a focal plane of the field lens, the number of the viewing zones being the same as the number of the at least two optical channels; and
a controller configured to generate and output control signals to each of the light source, the spatial light modulator, and the electric optical scanner based on the predetermined subframe sequence, wherein the electric optical scanner comprises an electro-optical modulator that changes an initial polarization state of the light beam to a predetermined polarization state, and a beam splitter which directs the light beam having the predetermined polarization state to the corresponding channel of the multi-channel projection optics.

* * * * *